United States Patent [19]
Güntherberg et al.

[11] Patent Number: 5,817,266
[45] Date of Patent: Oct. 6, 1998

[54] DEWATERING OF WATER-MOIST GRAFT RUBBER

[75] Inventors: Norbert Güntherberg, Speyer; Jürgen Hofmann, Ludwigshafen; Hilmar Ohlig, Kaiserslautern; Elmar Mailahn, Worms; Friedrich Seitz, Friedelsheim; Hermann Gausepohl, Mutterstadt; Jürgen Koch, Neuhofen; Andreas Deckers, Flomborn, all of Germany

[73] Assignee: BASF Aktiengesellschaft, Ludwigshafen, Germany

[21] Appl. No.: 736,439

[22] Filed: Oct. 24, 1996

Related U.S. Application Data

[63] Continuation-in-part of Ser. No. 375,571, Jan. 18, 1995, abandoned.

[30] Foreign Application Priority Data

Jan. 27, 1994 [DE] Germany .......................... 44 02 394.4

[51] Int. Cl.⁶ .............................. B29C 47/40; B29C 47/76
[52] U.S. Cl. .................... 264/211.23; 264/349; 425/203; 425/205
[58] Field of Search ..................... 264/101, 102, 264/349, 211.23; 425/203, 205, 209

[56] References Cited

U.S. PATENT DOCUMENTS

| | | |
|---|---|---|
| 3,672,641 | 6/1972 | Slaby . |
| 3,796,677 | 3/1974 | Laber et al. . |
| 4,110,843 | 8/1978 | Skidmore ................................. 366/83 |
| 4,446,094 | 5/1984 | Rossiter ................................. 264/349 |
| 5,232,649 | 8/1993 | Andersen et al. ....................... 264/349 |

FOREIGN PATENT DOCUMENTS

| | | |
|---|---|---|
| 534 235 | 3/1993 | European Pat. Off. . |
| 576 156 | 7/1969 | France . |
| 1579106 | 3/1963 | Germany . |
| 2037784 | 7/1970 | Germany . |

OTHER PUBLICATIONS

Pat. Abst. of Japan, vol. 9, No. 87 (M–372) Apr. 17, 1985 English abstract of JP 59–214631.
Pat. Abst. of Japan, vol. 13, No. 500 (M–891) Nov. 10, 1989 English abstract of JP 1–202406.

Primary Examiner—Mathieu D. Vargot
Attorney, Agent, or Firm—Keil & Weinkauf

[57] ABSTRACT

Essentially dry materials are obtained by mechanically dewatering water-moist rubber, prepared by emulsion polymerization and precipitation, to give a compact material having a rubber content of at least 50%, by a process in which the previously dewatered rubber is fed to the feed section of a twin-screw extruder which has screws rotating in the same direction and possesses, in succession in the conveying direction, at least two back-up zones and two associated dewatering orifices, each of which may be provided with a retaining screw, and at least one kneading zone, one devolatilization zone and finally one discharge zone, which may be closed by a die lip, and the water separated off is discharged at the dewatering orifices in liquid form.

6 Claims, 1 Drawing Sheet

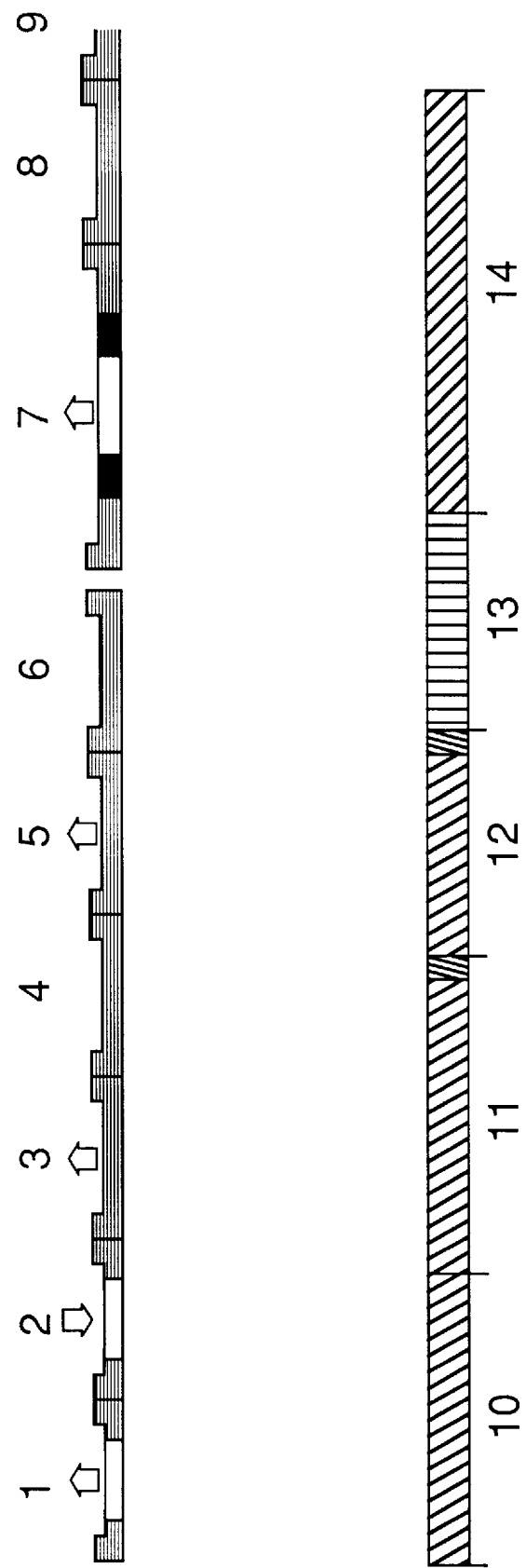

DEWATERING OF WATER-MOIST GRAFT RUBBER

This application is a continuation-in-part of application Ser. No. 08/375,571, filed on Jan. 18, 1995, now abandoned.

BACKGROUND OF THE INVENTION

1. Field of the Invention

The present invention relates to a process for the substantial mechanical dewatering of water-moist rubber to give a compact material having a rubber content of at least 50%.

Rubbers, especially, for example, graft rubbers, as required for impact modification of plastics, are usually prepared by emulsion polymerization; the latex obtained is coagulated by the addition of an electrolyte, washed with water, centrifuged and further dewatered. Such graft rubbers are, for example, butadiene-g-SAN or butyl acrylate-g-SAN, or rubbers synthesized in a plurality of stages and based on the monomers butadiene, styrene, butyl acrylate, methyl methacrylate or acrylonitrile. Rubbers for other intended uses are also often obtained by this method.

In general, the material moist after centrifuging and still containing up to 50% of water is dried and is then incorporated in a thermoplastic melt in the intended manner and thus processed to give the end product. In this case, the rubber is handled in the form of a powder, which tends to undergo spontaneous ignition owing to the content of fine dust.

2. Description of the Related Prior Art

According to a proposal described in DE-A-20 37 784, graft rubber moist after centrifuging can be introduced into an SAN melt with evaporation of the water, and a thermoplastic composition containing up to 60% of graft rubber can be obtained. This process requires a relatively large amount of electrical energy, and rubber particles and assistant residues are entrained with the evaporating water and have to be disposed of as special waste. The water stripped off in the form of steam and contaminated by rubber components must be regarded, together with the cooling water required for condensation, as waste water which requires treatment.

Moreover, deposits of auxiliaries which may occur in the extruders may contaminate the product.

U.S. Pat. Nos. 5,151,026 and 5,232,649 are of interest.

It is an object of the present invention to provide a process which substantially avoids the stated disadvantages. The following may be stated beforehand in this context:

It is known from general rubber technology that moist or more or less partially dewatered rubber can be obtained from slurries by pressing out the water mechanically in presses, including screw presses. This is frequently carried out using apparatuses which have strainer barrels through which the water can flow away in the same way as through a sieve. However, these strainer barrels tend to become blocked. The rubber obtained in this manner, which still has a certain residual moisture content, is then pressed to form bales or is granulated.

Obtaining thermoplastics from an aqueous environment has also led to similar solutions.

Thus, Japanese Patent Publication 86/053 362 describes a process for obtaining polymers from polymers which have not been dried or from slurries. An example is the dewatering of a poly-SAN slurry having a solids content of about 40% and a particle size of 0.3 mm in a twin-screw extruder which is provided with two strainer barrels and 3 devolatilization orifices. The devolatilization is effected under reduced pressure.

Japanese Patent Publication 2 286 208 describes a process in which a twin-screw extruder is used for dewatering thermoplastic molding materials. Here too, strainer barrels are provided for dewatering, and a plurality of devolatilization orifices for the evaporating water.

Japanese Patent Publication 84/027 776 describes a process for dewatering and plasticating ABS polymers in an extruder, the water being removed in a direction opposite to the transport direction, with subsequent two-stage devolatilization, or, in another embodiment, by means of a special screw provided with a plurality of constrictions. Such screw designs are available only as expensive specially produced products.

European Patent Publication 0 534 235 describes the preparation of toughened thermoplastics by incorporating mechanically partially dewatered rubber in a thermoplastic above the softening point of the thermoplastic, the rubber being partially dewatered prior to incorporation in an extruder and the remaining residual water being removed during the incorporation by devolatilization apparatuses which may be arranged before or after the mixing-in point.

This process likewise has the disadvantage that a large amount of water still has to be evaporated, two machines furthermore being required, ie. a main extruder and a side extruder, and likewise concentrates of only limited use being obtained.

SUMMARY OF THE INVENTION

We have found that this object is achieved and that the essentially mechanical dewatering of water-moist rubber can be carried out in a single twin-screw continuous kneader and compounder having commercial components to give a compacted, externally dry rubber material (compact material), if a machine having a pair of double-thread or preferably triple-thread screws rotating in the same direction is used, to the feed section of which the precipitated, previously dewatered but water-moist rubber is fed, the extruder possessing, in succession in the conveying direction, at least two back-up zones and two associated dewatering orifices, which, if required, are each provided with a retaining screw zone, and subsequently at least one kneading zone and thereafter at least one devolatilization zone and finally a discharge zone whose orifice may, if required, be closed by a die lip.

The diameters of the said two subsequent screw sections are different in that a second, downstream section is provided having a larger diameter than the first, upstream section, the enlargement of the screws being e.g. from 53 to 57 mm. It is preferred that the enlargement be sharp and preferably situated immediately upstream of the first devolatilization zone. It is understood that the diameter of the respective barrel zones is likewise enlarged, the distance between the outer surface of the respective screw and its surrounding barrel wall being usual. Downstream and upstream means preceding and succeeding, respectively, in the conveying direction.

The diameter of the downstream, enlarged screw section is generally between 1.02 and 1.2, preferably 1.04 and 1.15, times the diameter of the preceding screw section.

In a preferred embodiment the change in diameters of the respective screw sections is accompanied by a change in the numbers of threads of each screw, the first section having preferably three and the second, enlarged screw having only two threads. The second screw may, however, if appropriate, have only a single thread.

The novel arrangement may be assembled with the aid of commercial extruder components, which are available in the form of variously cut screw sections and associated barrel sections (shots) and, if required, can be exactly adapted to the specific dewatering problem.

A substantially mechanically dewatered material which is plasticated without further addition, for example of flow improvers or thermoplastics, and is converted into a cylindrical or pellet-like compact material (granules) which can be handled without giving rise to dust is obtained in this manner from various types of water-moist rubber.

The novel process is suitable for the production of rubber granules for various intended uses; it is intended in particular for the production of rubber raw materials such as those used for impact modification of brittle plastics, for example rubbers based on butadiene copolymers, butadiene/acrylonitrile copolymers or butadiene/styrene copolymers or graft copolymers and rubbers based on acrylates which form elastomeric polymers, such as ethyl acrylate, butyl acrylate or ethylhexyl acrylate. The suitable monomers may also be substitution products of the above monomers. In general, polymers of unsubstituted or substituted 1,3-dienes or n-alkyl acrylates and their copolymers or graft copolymers with vinylaromatic monomers, such as styrene, or other monomers forming rigid polymers, such as acrylonitrile or methyl methacrylate, are suitable.

BRIEF DESCRIPTION OF THE FIGURE

The figure depicts a twin screw extruder with various barrel sections.

Practical description of the process (see the FIGURE)

A triple-thread twin-screw extruder (type ZSK 53 from the manufacturer Werner & Pfleiderer) which consists of the following barrel sections is used:

if desired, an unheated barrel section (1) provided with an orifice at the top, in order to remove occluded air;

section (2), feed orifice, unheated, provided with single screw (ESB45) metering apparatus;

section (3) unheated, with dewatering orifice at the top, provided with retaining screw (3a);

section (4), unheated, without orifice;

section (5), unheated, with dewatering orifice at the top, provided with retaining screw (5a);

section (6), closed;

devolatilization section (7, heated) for atmospheric devolatilization, widening of the barrel, for example from 53 to 57 mm conveying section (8), closed, heated;

die lip (9) for shaping the material to be discharged.

The barrel sections described above correspond to screw sections (see the FIGURE) which may be defined as follows:

Feed and conveying section (10)

first squeeze zone (11)

second squeeze zone (12)

kneading zone (13)

devolatilization and discharge section (14).

DESCRIPTION OF THE PREFERRED EMBODIMENTS

EXAMPLE

The moist rubber is conveyed into the feed orifice of a twin-screw extruder which has screws which rotate in the same direction, are each triple-thread and have a right-handed rotation in the entrance zone (section 10; FIGURE).

By means of a suitable screw geometry or an orifice upstream in the conveying direction, it is possible for any occluded air to escape. The rubber is conveyed toward a back-up zone, in this case a double left-handed thread, downstream in the conveying direction. This builds up pressure, which presses out the water enclosed in the rubber (section 11). The water can flow away through the dewatering orifice in the barrel at atmospheric pressure. For example, from 35 to 80% of the adhering water are removed here. The water is at about 25° C.–90° C. on leaving the extruder.

The partially dewatered rubber is transported away from the back-up zone (11), which acts as an obstacle, toward a second back-up zone (12), where further dewatering to remove up to a further 25% of the total water takes place. The temperature increases to about 100° C. as a result of the friction. The partially dewatered rubber is generally still in powder form here. The second back-up zone is followed by a kneading zone (12). The energy required for evaporation of the remaining water and for plastication is introduced here. This is followed by an atmospheric devolatilization stage in which further residual amounts of water escape, in this case as vapor (14). The small amount of water and the relatively large devolatilization orifice (7) ensure that no particles are entrained or that entrained particles fall back immediately. The plasticated and compacted rubber is discharged through a die plate (9) and is at 130°–180° C. here. The residual moisture content is from 7 to 0.5%.

The novel process was investigated for various materials.

A-1

Polybutadiene rubber, grafted with SAN, according to DE-A-24 27 960 or EP-A-258 741 (component A there), precipitated by the addition of an electrolyte and previously dewatered to a residual moisture content of from 27 to 33% by weight of water.

A-2

Polybutyl acrylate rubber, grafted with SAN, according to DE-A-12 60 135 (component A), precipitated by the addition of an electrolyte and previously dewatered to a residual moisture content of from 27 to 33% of water.

A-3

Polybutyl acrylate rubber, grafted with SAN, according to DE-A-31 49 358 (components A+B), precipitated by the addition of an electrolyte and previously dewatered to a residual moisture content of from 30 to 38% of water.

The graft rubber materials were fed to the extruder described above. The water discharge and the rubber discharge in the first and second squeeze zones, and the residual moisture content of the granules and the temperature of the discharged compact material and of the water squeezed out were measured. The amount of water evaporated was calculated. All amounts were determined geometrically.

| Example | 1 | 2 | 3 |
|---|---|---|---|
| Rubber component | A-1 | A-2 | A-3 |
| Throughput moist (kg/h) | 100 | 110 | 110 |
| Speed/rpm | 280 | 250 | 200 |
| Initial moisture content (% by weight) | 29.7 | 29.9 | 34.3 |
| Discharge on 1st dewatering | | | |
| Water (% by weight) | 12.9 | 16.9 | 22.9 |
| Temperature (°C.) | 28 | 26 | 39.4 |
| Rubber (% by weight) | 3.3 | 4.6 | 4.4 |
| Discharge on 2nd dewatering | | | |
| Water (% by weight) | 6.7 | 3.8 | 0.3 |
| Temperature (°C.) | 87 | 78 | 84 |

| | | | |
|---|---|---|---|
| -continued | | | |
| Rubber (% by weight) | 0.3 | 0.1 | 0 |
| Devolatilization Vapor (% by weight) | 7.7 | 7.9 | 8.6 |
| Extrudate moisture content Water (% by weight) | 2.4 | 1.3 | 2.9 |

We claim:

1. A process for obtaining essentially dry materials by mechanically dewatering water-moist rubber, prepared by emulsion polymerization and precipitation, to give a compact material having a rubber content of at least 50% in a twin-screw kneader, wherein the previously dewatered rubber is fed to the feed section of a twin-screw extruder which possesses at least one first barrel zone or section consisting of a pair of first screws and one second barrel zone or section consisting of a pair of second screws, each pair of screws rotating within an associated barrel in the same direction and, in succession in the conveying direction, at least two back-up zones and two associated dewatering orifices and at least one kneading zone, at least one devolatilization zone and finally one discharge zone, wherein the diameter of the said two barrel zones is enlarged immediately upstream of a first devolatilization zone in that the second, downstream zone has a larger diameter than the previous, first zone, the diameter of the second, enlarged zone being between 1.02 and 1.2 times the diameter of the first zone and the water separated off is discharged at the dewatering orifices in liquid form.

2. A process as claimed in claim 1, wherein the dewatering orifices are each provided with a retaining screw, and the discharge zone is closed by a die lip.

3. A process as claimed in claim 1, wherein a rubber latex based on a diene polymer or acrylate polymer or on one of their graft polymers is dewatered.

4. A process as claimed in claim 1, wherein the diameter of the second, enlarged zone is between 1.04 and 1.15 times the diameter of the first zone.

5. A process as defined in claim 3, wherein the enlargement is from 53 to 57 mm.

6. A process as claimed in claim 1, wherein the enlargement is stepwise and situated immediately in front of the first devolatilatition zone.

* * * * *